United States Patent [19]

Simizu

[11] Patent Number: 4,797,800
[45] Date of Patent: Jan. 10, 1989

[54] POWER REGULATING SYSTEM FOR AN ENGINE GENERATOR

[75] Inventor: Motohiro Simizu, Saitama, Japan

[73] Assignee: Honda Giken Kogyo Kabushiki Kaisha, Tokyo, Japan

[21] Appl. No.: 147,244

[22] Filed: Jan. 20, 1988

[30] Foreign Application Priority Data

Jan. 26, 1987 [JP] Japan .................................. 62-13153
Jan. 26, 1987 [JP] Japan .................................. 62-15848

[51] Int. Cl.⁴ ....................... H02M 5/458; H02H 7/10
[52] U.S. Cl. ........................................ 363/37; 363/50; 322/1; 322/90
[58] Field of Search ................. 363/35, 37, 50, 51–56; 322/1, 90

[56] References Cited

U.S. PATENT DOCUMENTS

| 3,831,077 | 8/1974 | Richeson, Jr. | 363/37 |
| 4,331,994 | 5/1982 | Wirth | 363/37 |
| 4,521,840 | 6/1985 | Hoadley | 363/51 |
| 4,527,214 | 7/1985 | Hattori et al. | 363/51 |

FOREIGN PATENT DOCUMENTS 59-132398  9/1984  Japan .
60-82098   5/1985  Japan .
62-500557  3/1987  Japan .

Primary Examiner—Peter S. Wong
Attorney, Agent, or Firm—Lyon & Lyon

[57] ABSTRACT

A power generating system for an engine generator having an engine, an AC generator driven by the engine and an inverter for reconverting a rectification output of a main output winding of the AC generator into an alternating current of arbitrary frequency according to a driving signal. An overcurrent detecting circuit detects an overcurrent state of the inverter on the basis of the result of comparison between a detected value of the current carried to the inverter and a reference value. The inverter is protected from the overcurrent state when detected by cutting off the driving signal and thus inactivating the inverter. There is an automatic reference value setting circuit for changing the reference value stepwise to thereby set an optimal reference value in accordance with the ON/OFF state of a semiconductor switching element which is turned ON/OFF on the basis of the result of comparison between a signal based on a voltage which changes in accordance with a rectification output of an auxiliary output winding of the AC generator and a signal based on a voltage obtained by stabilizing the rectification output.

12 Claims, 4 Drawing Sheets

POWER REGULATING SYSTEM FOR AN ENGINE GENERATOR

BACKGROUND OF THE INVENTION

1. Field of the Invention

The present invention relates to a power regulating system for engine generator, which comprises rectifying AC output of an AC generator, and then reconverting it into an alternating current of arbitrary frequency on an inverter before outputting it.

2. Description of the Prior Art

For example, a device in which a small gasoline engine and a generator are combined to obtain AC power outdoors is known hitherto as a portable engine generator or portable generator, which is used extensively for leisure enjoyment, field works, emergency measures and others. An AC generator such as alternator or the like is used generally as the aforementioned generator, and an engine rotational frequency (n), an output frequency (f) and a generator pole number (p) are interrelated as $n = 120 \, f/p$, as is known, in this case. Then, a bipolar or quadripolar generator is used generally, and hence for obtaining an AC output stabilized at 50 Hz (or 60 Hz), the engine rotational frequency must be stabilized in a relatively low domain coming in 3,000 rpm (or 3,600 rpm) in the case, for example, of the bipolar generator. Thus, the engine is controlled for rotation by a governor or other means, however, since the engine rotational frequency is in a relatively low domain, the operation efficiency of the engine is low and there is no alternative but to make the generator larger on power capacity. Still further, since the output frequency is set by the engine rotational frequency, it is difficult to keep the output frequency constant all the time.

There is known such engine generator using an inverter power regulating system that will run the engine in a domain high of rotational frequency, convert the output of the generator into a direct current once, and then reconvert it into an alternating current of arbitrary frequency on an inverter before outputting it. The inverter type engine generator has the inverter on an output stage constituted of a semiconductor switching element such as a transistor or the like, and the arrangement is such that an AC output of desired voltage and frequency is obtainable by controlling the switching element on a driving signal (commutating signal) given thereto from an oscillator. Those which are disclosed, for example, in Japanese Utility Model Laid-Open No. 132398/1984, Japanese Patent Laid-Open No. 82098/1985 and Japanese Patent Publication No. 500557/1987 are known as representing such system.

In the generator of the type described above, since the inverter in the output stage is constituted of a semiconductor switching element such as a transistor or the like, it is necessary to provide a circuit for protecting the semiconductor switching element from overcurrent.

However, in the conventional generator of the type described above, a set point for the overcurrent protecting operation is fixedly set in accordance with a particular allowable rated outout. Therefore, when the inverter is to be protected by detecting an overcurrent state of the inverter, it is impossible to reliably protect the inverter as a result of changes in the engine rotational frequency. Accordingly, in order to change the rated output by making the engine rotational frequency variable, it is necessary to provide an external switch or the like, and this complicates the arrangement and necessitates the switch to be actuated to change the rated output, resulting in inferior operability.

SUMMARY OF THE INVENTION

In view of these circumstances, it is an object of the present invention to provide a power regulating system for engine generator which is so designed that it is possible to protect the inverter from overcurrent securely and stably without the need to provide any external switch or the like for changing the rated output as in the case of the conventional arrangement even when the rated output of an AC generator is to be changed.

It is another object of the present invention to provide a power regulating system for an engine generator which is arranged such that a set point (reference value) for protecting the inverter from overcurrent is automatically changed in accordance with a change in setting of the rated output but is not caused to change by a fluctuation in the set engine rotational frequency nor variations in the output characteristics of the AC generator itself.

DETAILED DESCRIPTION OF PREFERRED EMBODIMENTS

Preferred embodiment of the present invention will be described hereinunder with reference to the accompanying drawings.

Figure 1:
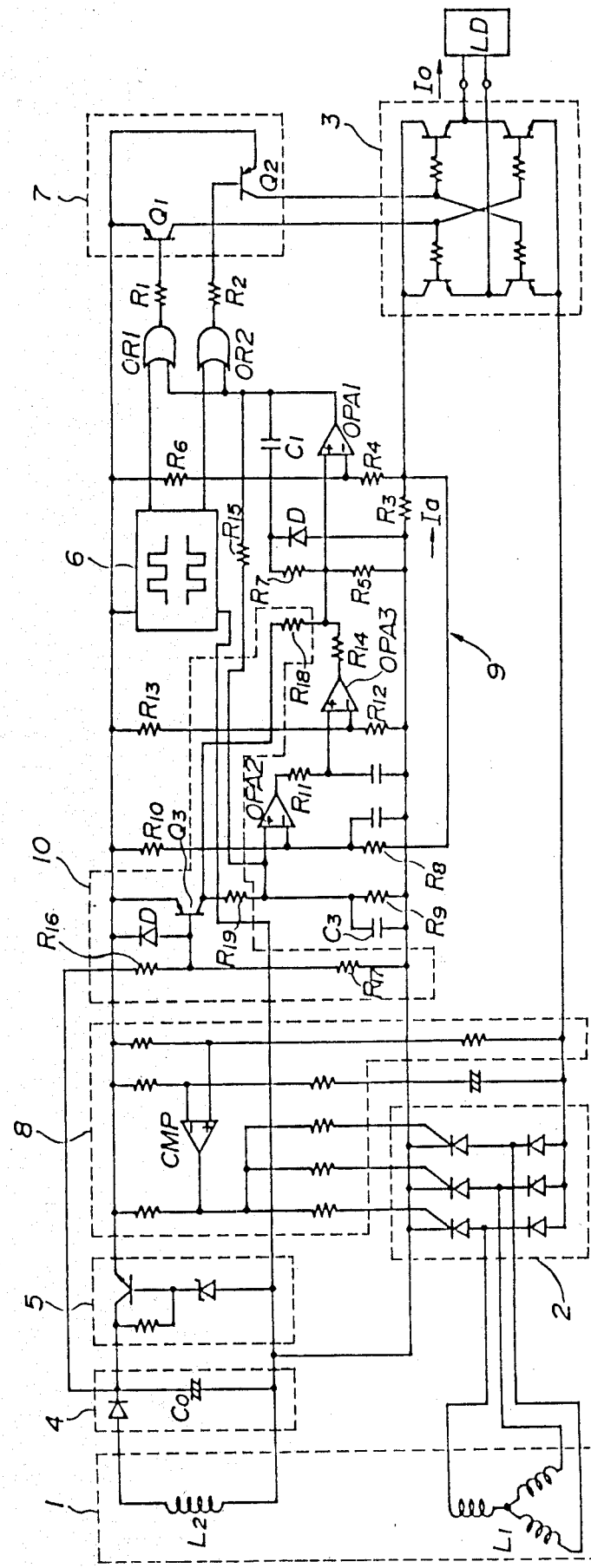
FIG. 1 is a circuit diagram showing one embodiment of the power regulating system for an engine generator according to the present invention.

FIG. 1 shows the circuit configuration of one embodiment of the power regulating system for an engine generator. In the drawing, the reference numeral 1 denotes an AC generator driven by an engine, which is provided with an output winding $L_1$ for outputting a three-phase alternating current and a controlling auxiliary winding $L_2$. The three-phase AC output of the output winding $L_1$ is subjected to a full-wave rectification by a three-phase rectifier circuit 2 consisting of a thyristor bridge and is then given to an inverter 3 constituted of a power transistor bridge circuit. The single-phase AC output of the auxiliary winding $L_2$ is rectified through a rectifier circuit 4, stabilized then by a constant voltage circuit 5 and is given to an oscillator 6 for driving the inverter 3 and also to a driver 7 consisting of driving transistors $Q_1$ and $Q_2$. A constant voltage control circuit 8 having a comparator CMP is provided on the output side of the constant voltage circuit 5, which detects a fluctuation of the generator output voltage to control an angle of conduction of each thyristor in the three-phase rectifier circuit 2, and holds the rectifying output at a constant voltage level. More specifically, an output voltage of the three-phase rectifier circuit 2 is compared with a preset reference voltage on the comparator 7, and the angle of conduction of each thyristor is controlled so as to equalize the power voltage with the set voltage. Here, the controlling system is provided separately from the main circuit system as described, and thus no trouble may result in the controlling system even from a drop in ouput voltage of the generator.

The inverter 3 on the output stage is controlled according to driving signals from the transistors $Q_1$, $Q_2$, and converts the inputted direct current into an alternating current of arbitrary frequency. The transistors $Q_1$, $Q_2$ are subjected each to a switching control according to a pulse train signal output from the oscillator 6 feeding pulse signals alternately on an output frequency of the oscillator 6, for example, a commercial frequency, and an output of an operational amplifier OPA1 in an inverter protecting circuit 9. That is, bases of the transistors $Q_1$, $Q_2$ are connected to output sides of OR gates OR1, OR2 constituting a circuit for protecting the inverter 3 through resistances $R_1$, $R_2$, respectively, and one input side of each of the OR gates OR1, OR2 is connected to the oscillator 6, while the other input sides are respectively connected to the oscillator 6 and the output side of the operational amplifier OPA1. Then, a resistance (shunt) $R_3$ for current detection is interposed in a DC bus through which a DC current to the inverter 3 flows, and both ends of the resistance $R_3$ are connected to an inversional input side (−) of the operational amplifier OPA1 and a non-inversional input side (+), respectively, through resistances $R_4$, $R_5$. Further, resistances $R_6$, $R_7$ are connected in series to the resistances $R_4$, $R_5$, and a diode $D_1$ is connected in parallel to a series circuit of the resistances $R_5$ and $R_7$. In addition, a capacitor $C_1$ is connected in series to the parallel circuit of the resistances $R_5$, $R_7$ and the diode $D_1$.

An operational amplifier OPA2 is provided so as to cooperate with the constant voltage control circuit 8 to define an overcurrent detecting means. An inversional input side of the operational amplifier OPA2 is connected to the rear stage side of the resistance $R_3$ through a resistance $R_8$, and a non-inversional input side of the operational amplifier OPA2 is connected to the DC bus mentioned hereinbefore through a resistance $R_9$. Further, capacitors $C_2$, $C_3$ are interposed between these input sides and the DC bus. A resistance $R_{10}$ is connected in series to the resistance $R_8$. The other end of the resistance $R_{10}$, together with the resistance $R_6$, is connected to a line leading to a smoothing capacitor $C_0$ in the rectifier circuit 4.

The output side of the operational amplifier OPA 2 is connected to a series circuit of a resistance $R_{11}$ and a capacitor $C_5$, and the node is connected to the noninversional input side of an operational amplifier OPA3. The inversional input side of the operational amplifier OPA3 is connected to the DC bus through a resistance $R_{12}$, and a resistance $R_{13}$ is connected in series to the resistance $R_{12}$. The output side of the operational amplifier OPA3 is connected to the non-inversional input side of the operational amplifier OPA1 through a resistance $R_{14}$, and the non-inversional input side of the operational amplifier OPA2 is connected to the output side of the operational amplifier OPA1 through a resistance $R_{15}$.

The operation will next be described. As described hereinbefore, a three-phase AC output of the AC generator 1 is converted into a direct current through the three-phase rectifier circuit 2. Then, it is reconverted to an alternating current of predetermined frequency on the inverter 3 according to a driving signal given by way of the driving transistors $Q_1$, $Q_2$ in the driver 7, and is fed to a load such as a motor, an incandescent lamp or the like. In this case, the driving transistors $Q_1$, $Q_2$ repeat ON and OFF alternately according to an output pulse of the oscillator 6, and each power transistor of the inverter 3 is subjected to switching control thereby, thus obtaining an AC output in the pattern of desired voltage and frequency. Then, a current Ia flowing to the inverter 3 appears as a voltage drop across the resistance $R_3$, and when the voltage value exceeds a predetermined value, or when the current flowing to the inverter 3 exceeds a predetermined value, the situation is decided as an overcurrent, and the driving signal to the inverter 3 is stopped for a predetermined period of time by a discharging timer of the capacitor $C_1$ according to the signal from the operational amplifier OPA1, thus protecting the inverter 3.

In this case, both the operational amplifiers OPA2 and OPA1 detect the overcurrent state of the inverter 3, but while the operational amplifier OPA1 detects a peak value in response to a rise in the current carried to the inverter 3, the operational amplifier OPA2 detectes a mean value of the current averaged by the capacitor $C_2$. Then, the operational amplifiers OPA1, OPA2 compare each detection value (voltage value) with the reference value (voltage value divided by the resistances $R_4$, $R_6$ and the resistances $R_6$, $R_{10}$), and when the detection value has exceeded the set point, the situation is decided as overcurrent state. When the overcurrent state is detected, the inverter 3 is stopped by an output from the operational amplifier OPA1 in every cases as described. That is, the current Ia flowing to the resistance $R_3$ increases according as the output current Io to a load LD increases, and when the current value exceeds a predetermined value, the output of the operational amplifier OPA1 inverts to become a high-level signal, so that the outputs of the OR gates OR1, OR2 are continuously at the high levels, thus causing both the driving transistors $Q_1$, $Q_2$ in the driver 7 to turn off. In this case, however, since the capacitor $C_1$ and the diode $D_1$ are connected to the output side of the operatioinal amplifier OPA1, the inverter operation is recommenced after a predetermined time (charging time of the capacitor $C_1$) even if the peak current becomes an overcurrent to stop the output. Thus, even such load as is large in rush current is ready for start-up securely. Further, since the resistance $R_{11}$ and the capacitor $C_4$ are connected to the output side of the operational amplifier OPA2, the inverter 3 is never stopped operating immediately if the mean current becomes an overcurrent, thus the inverter is kept going for the period of time decided by a time constant of the resistance $R_{11}$ and the capacitor $C_5$, and is stopped after the lapse of a charging timer time by the capacitor $C_4$. Since this stop state is continued by the closed loop formed by OPA2→ OPA3→OPA1-→OPA2, it cannot return automatically, therefore the inverter protecting means functions as if it were NFB (no fuse breaker). Further, in the case the peak current becomes an overcurrent and the inverter 3 is stoppd operating only for the period of time predetermined on an output of the operational amplifier OPA1, an output signal of the operational amplifier OPA1 is inputted to the non-inversional input terminal of the operational amplifier OPA2 through the resistance $R_{15}$ and is stored in the capacitor $C_3$. Accordingly, where a charge storage of the capacitor $C_3$ according to the output signal from the operational amplifier OPA1 which indicates a presence of the peak current becomes much, the operational amplifier OPA2 is operated despite an overcurrent state of the mean current, and the inverter 3 is stopped operating not to return automatically as in the case of the mean current being an overcurrent state.

According to the present invention, the above-described arrangement is additionally provided with an automatic reference value setting circuit 10 to cope with changes in setting f the rated output of the engine which may be effected in such a manner that, when, for example, the load LD is small, the engine rotational frequency is set at a relatively low value, i.e., 3,000 rpm, (silent mode; quiet running) to thereby obtain a rated output of 150 W, whereas, when the load LD is large, the engine rotational frequency is set at a relatively high value, i.e., 4,500 rpm, (power mode; high power running) to thereby obtain a rated output of 300 W. More specifically, in order to change the reference set points for overcurrent detection in the inverter protecting circuit 9 in accordance with a change in setting of the engine rotational frequency at a particular time, that is, a change in the rated output of the AC generator 1, the automatic reference value setting circuit 10 employs a switching transistor $Q_3$ which is turned ON/OFF in accordance with the result of comparison between a signal based on a voltage which changes in accordance with the rectification output of the rectifier circuit 4 and a signal based on a voltage obtained by stabilizing the rectification output, and the circuit 10 changes stepwisely the reference set points for the operational amplifiers OPA1, OPA2 in the inverter protecting circuit 9 in accordance with the ON/OFF state of the switching transistor $Q_3$ which is switched over from one state to the other in response to a change in setting of the rated output of the engine.

The automatic reference value setting circuit 10 consists of the transistor $Q_3$ arranged to be turned ON/OFF in accordance with the result of the comparison made through a diode $D_2$ between a voltage obtained dividing an output voltage of the rectifier circuit 4 by resistances $R_{16}$, $R_{17}$ and an output voltage of the constant voltage circuit 5, and biasing resistances $R_{18}$, $R_{19}$ which superpose bias voltages on the non-inversional input terminals of the operational amplifiers OPA1, OPA2, respectively, in the inverter protecting circuit 9 when the transistor $Q_3$ is ON.

The terminal voltage Vco of the smooting capacitor $C_0$ in the rectifier circuit 4 changes substantially proportional to the rotational frequency of the engine for driving the AC generator 1. Since the emitter potential of the transistor $Q_3$ is stabilized through the constant voltage circuit 5 so as to be held at a constant voltage Vreg, the ON/OFF conditions of the transistor $Q_3$ are as follows:

When $Vco < \{(R_{16}+R_{17})/R_{17}\}\cdot(Vreg-V_{BE})$, $Q_3$ turns ON, whereas, when $Vco > \{(R_{16}+R_{17})/R_{17}\}\cdot(Vreg-V_{BE})$, $Q_3$ turns OFF. In the above-described conditions, $V_{BE}$ is a loss voltage at the time when a forward current flows between the base and emitter of the transistor $Q_3$.

Accordingly, the transistor $Q_3$ turns ON when the engine rotational frequency falls within a rotational frequency domain which is lower than an engine rotational frequency at which the condition of $Vco = \{(R_{16}+R_{17})/R_{17}\}\cdot(Vreg-V_{BE})$ is satisfied, and the transistor $Q_3$ turns OFF when the engine rotational frequency is in a rotational frequency domain which is higher than said boundary rotational frequency.

In this embodiment, for example, when the engine rotational frequency in the aforementioned silent mode is 3,000 rpm, the transistor $Q_3$ turns ON, whereas, when the engine rotational frequency in the power mode is 4,500 rpm, the transistor $Q_3$ turns OFF.

When the transistor $Q_3$ is OFF, conditions for overcurrent detection in the operational amplifiers OPA1, OPA2 in the inverter protecting circuit 9 are set as follows:

Overcurrent detection conditions ①

$$OPA1: Ia > \frac{R_4}{R_3(R_6 + R_4)} \cdot Vreg$$

$$OPA2: \overline{Ia} > \frac{R_8}{R_3(R_{10} + R_8)} \cdot Vreg$$

When the transistor $Q_3$ is ON, a voltage obtained by dividing Vreg is superposed on each of the non-inversional input sides of the operational amplifiers OPA1, OPA2 in the inverter protecting circuit 9 through the resistances $R_{18}$, $R_{19}$, and overcurrent detecting conditions in the operational amplifiers OPA1, OPA2 are set as follows:

Overcurrent detecting conditions ②

$OPA1: Ia >$ $$\frac{R_4 + R_6}{R_3 R_6} \left( \frac{R_4}{R_4 + R_6} - \frac{R_5 R_{14}}{R_5 R_{14} + R_{18}(R_5 + R_{14})} \right) \cdot Vreg$$

$$OPA2: \overline{Ia} > \frac{R_8 + R_{10}}{R_3 R_{10}} \left( \frac{R_8}{R_8 + R_{10}} - \frac{R_9}{R_9 R_{19}} \right) \cdot Vreg$$

Thus, when the engine rotational frequency is within the high domain, the transistor $Q_3$ turns OFF to thereby regulate the output allowable current Ia of the inverter 3 under the overcurrent detecting whereas, 1 when the engine rotational frequency is within the low domain, the transistor $Q_3$ turns ON to thereby regulate the output allowable current Ia of the inverter 3 under the overcurrent detecting conditions 2.

As to the output of the AC generator 1, the higher the engine rotational frequency, the higher the generator output. Therefore, the circuit configuration is so arranged that the output current Io of the inverter 3 is larger in the case of the overcurrent detecting conditions ① for the high rotational frequency domain than in the case of the overcurrent detecting conditions ② for the low rotational frequency. It is possible to set reference set points for overcurrent detection as desired on the basis of the circuit constant on the premise that the current Ia in the case of the overcurrent detecting conditions ① is made larger, and the reference set points can be determined only by each resistance value and the value of the output voltage Vreg of the constant voltage circuit 5. Accordingly, the reference set points for overcurrent detection never exceed the point at which the ON/OFF state of the transistor $Q_3$ changes as long as the engine rotational frequency rises in a predetermined way and the output voltage Vreg of the constant voltage circuit 5 is stabilized and held at a constant level, and there is therefore no fear of the reference set points being caused to fluctuate by a change in the rated rotational frequency of the engine or variations in the output characteristictics of the AC generator 1 itself.

Figure 2:
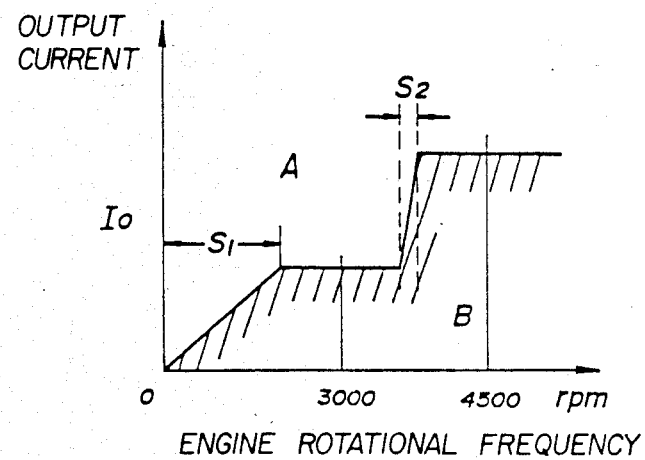
FIG. 2 is a characteristic chart showing the relationship of the output current with the engine rotational frequency in the embodiment shown in FIG. 1.

FIG. 2 is a characteristic chart showing the relationship of the output current Io of the inverter 3 with the engine rotational frequency at the time when the overcurrent protecting operation according to the present invention is executed. In the drawing, the reference symbol A denotes the range within which the overcurrent detecting conditions hold, while B denotes the range within which the current is allowed to flow to the inverter 3. Further, $S_1$ denotes a period of time which begins at the time when the engine starts and which ends at the time when the output voltage Vreg of the constant voltage circuit 5 has risen in a predetermined way, while $S_2$ denotes a rotational frequency zone at the point of change of the ON/OFF state of the transistor $Q_3$.

The rotational frequency zone $S_2$ is determined by voltage drop across the resistance $R_{16}$. When the current amplification factor $h_{FE}$ of the transistor $Q_3$ is sufficiently large, the rotational frequency zone $S_2$ is substantially coincident with a value obtained by multiplying an engine rotational frequency at the point of change of the ON/OFF state of the transistor $Q_3$ by the same ratio as the ripple component ratio in the terminal voltage Vco of the smooting capacitor $C_0$ in the rectifier circuit 4.

Accordingly, by reducing ripples in Vco, that is, by sufficiently increasing the capacitance of the smoothing capacitor $C_0$ in the rectifier circuit 4, the width of the rotational frequency zone S at the point of change of the ON/OFF state of the transistor $Q_3$ is narrowed to sharpen the characteristics at this region, thereby enabling enlargement of a stable region within which the reference set points for overcurrent detection do not change.

In the case where the output voltage of the auxiliary winding $L_2$ lowers due to an abnormal lowering in the engine rotational frequency or an abnormality occurring in the AC generator 1 and thus the output voltage Vreg of the constant voltage circuit 5 cannot be maintained at a constant level, since the reference set points for overcurrent detection are proportional to Vreg, the inverter output allowable current Ia is regulated under the overcurrent detecting conditions ② so as to change toward the safe side, that is, decrease, and the inverter 3 is thereby protected securely.

Figure 3:
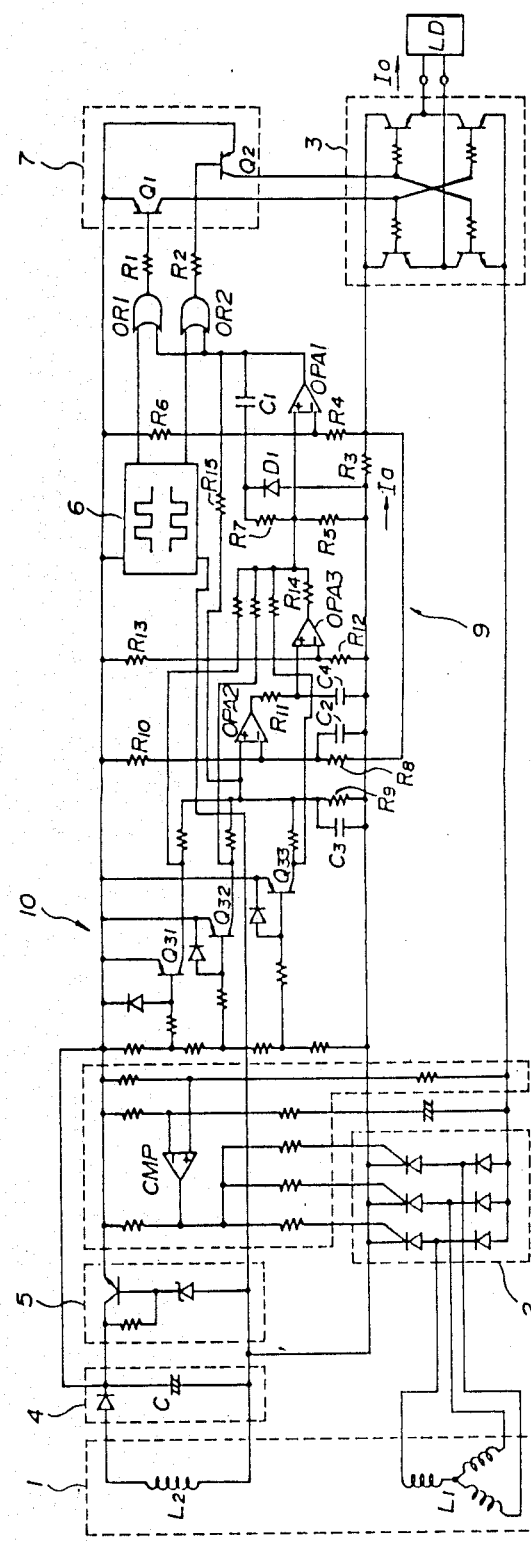
FIG. 3 is a circuit diagram of a modification of the embodiment shown in FIG. 1.

It should be noted that, although in the foregoing embodiment the engine rotational frequency is changed to either one or the other of two levels in order to change the rated output of the inverter, it is also possible to change the rated output in a multistage manner by, for example, providing switching means consisting of transistors $Q_{31}$, $Q_{32}$, $Q_{33}$ in a multistage fashion as shown in FIG. 3 so that ON/OFF switching conditions for the transistors $Q_{31}$ to $Q_{33}$ are different from each other in accordance with the engine rotational frequency, thus changing over the overcurrent detecting conditions for the operational amplifiers OPA1, OPA2 in a multiplicity of stages.

As has been described above, it is possible to automatically and reliably change set points for the operation of protecting the inverter from overcurrent without the need for any external switch which has heretofore been required when the rated output of the inverter is changed stepwisely. Therefore, it is possible to widen the zone in which set points for the overcurrent protecting operation are independent of a fluctuation of the rotational frequency of the engine for driving the generator or variations in the output characteristics of the generator by, in particular, sharpening the characteristics at the point of change of the ON/OFF state of the switching means. Thus, it is advantageously possible to stably effect protection of the inverter from overcurrent and provide a power regulating system which is suitable for mass production.

Figure 4:
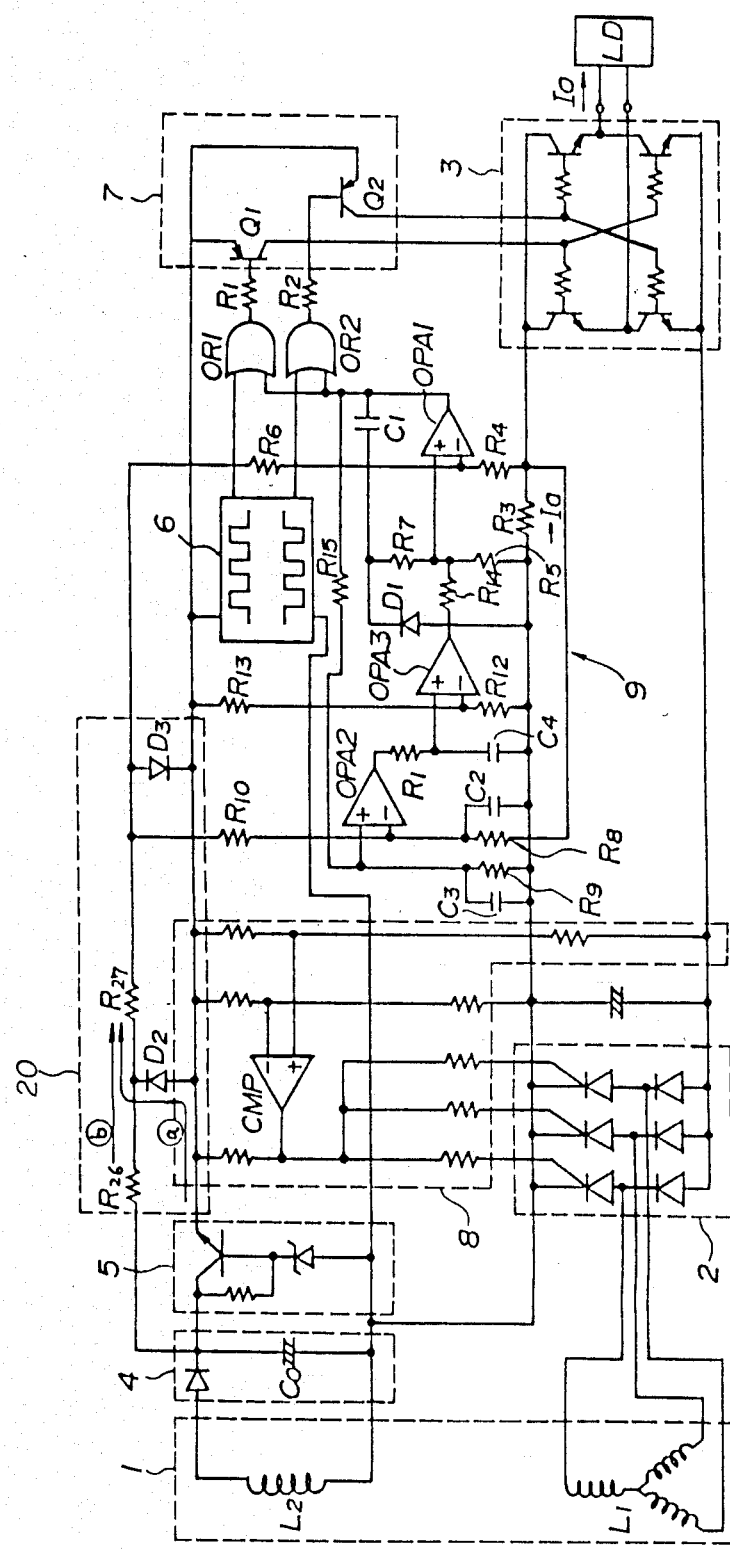
FIG. 4 is a circuit diagram showing another embodiment of the present invention.

FIG. 4 shows another embodiment of the present invention in which is provided an automatic reference value setting circuit 20 which consists of resistances $R_{26}$, $R_{27}$ and diodes $D_2$, $D_3$ and which is arranged to change reference set points in the operational amplifiers OPA1, OPA2 in the inverter proteoting circuit 9 stepwisely in accordance with the result of comparison between a signal based on a voltage which changes with the rectification output of the rectifier circuit 4 and a signal based on a voltage which is obtained by stabilizing the rectification output through the constant voltage circuit 5, thus coping with a change in setting of the rated output.

Figure 5:
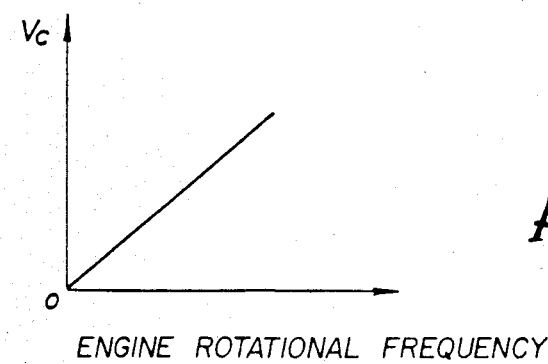
FIG. 5 is a characteristic chart showing the relationship of the output voltage of the rectifier circuit with the engine rotational frequency in the embodiment shown in FIG. 4.

The terminal voltage Vc of the capacitor $C_0$ in the rectifier circuit 4 is proportional to the rotational frequency of the engine for driving the AC generator as shown in FIG. 5. Accordingly, the following circuit configuration may be adopted when it is desired to arrange the power regulating system such that, when, for example, the load LD is small, the engine rotational frequency is set at a relatively low value, i.e., 3,000 rpm, (silent mode; quiet running) to thereby obtain a rated output of 150 W, whereas, when the load LD is large, the engine rotational frequency is set at a relatively high value, i.e., 4,500 rpm, (power mode; high power running) to thereby obtain a rated output of 300 W. More specifically, in order to change the reference set points for overcurrent detection in the inverter protecting circuit 9 in accordance with a change in setting of the engine rotational frequency at a particular time, that is, a change in the rated output of the AC generator 1, the resistances $R_6$, $R_{10}$ on the reference input sides of the operational amplifiers OPA1, OPA2 may be connected directly to the output side of the rectifier circuit 4 not through the constant voltage circuit 5 to thereby obtain reference voltages for the operational amplifiers OPA1, OPA2 from the capacitor $C_0$ in the rectifier circuit 4.

In such a case, however, if the engine rotational frequency is unsteady, the reference set points for overcurrent detection may fluctuate to make unstable the operation of protecting the inverter 3 from overcurrent. Further, since the reference set points are changed in response to a change in voltage, they are greatly affected by output voltage variations from the rating due to the performance of the AC generator 1 itself, resulting in an unstable overcurrent protecting operation.

Thus, in this embodiment, the automatic reference value setting circuit 20 is provided so as to extend over from the rectifier circuit 4 to the constant voltage circuit 5, so that it is possible to automatically set optimal reference values for overcurrent detection in the inverter protecting circuit 9 in accordance with a change in setting of the rated output without being affected by fluctuations of the engine rotational frequency nor variations in the output characteristics of the generator, and thus protect the inverter 3 from overcurrent stably.

More specifically, reference set points for overcurrent detection which are set respectively in the operational amplifiers OPA1, OPA2 in the inverter protecting circuit 9 are proportional to a voltage VB applied to the voltage divider resistances $R_6$, $R_4$ and $R_{10}$, $R_8$ on the respective reference input sides of the operational amplifiers OPA1, OPA2.

In this case, in an engine rotational frequency domain from 0 to $N_1$ where the engine for driving the AC generator 1 is started and the output voltage of the constant voltage circuit 5 gradually rises until it reaches a predetermined value, current flows through the route ⓐ in FIG. 4, and at this time, $V_B$ is given by the following equation (1):

$$V_B = \frac{V_C}{R_{17}\{1/(R_{10} + R_8) + 1/(R_6 + R_4)\} + 1} \quad (1)$$

where $V_C$ is a terminal voltage of the capacitor $C_0$ in the rectifier circuit 4, which changes in proportion to the engine rotational frequency. Accordingly, in the engine rotational frequency domain from 0 to $N_1$, the reference set points for overcurrent detection change in accordance with the engine rotational frequency.

In the engine rotational frequency domain from $N_1$ to $N_2$ (e.g., the rated rotational frequency, i.e., 3,000 rpm, in the aforementioned silent mode is included in this domain) where the output voltage of the constant voltage circuit 5 has been stabilized so as to be held at a constant value E and the potential at the voltage dividing point between the resistances $R_{26}$, $R_{27}$ is lower than the output voltage E of the constant voltage circuit 5, current flows through the route ⓐ in FIG. 4, and in this case, $V_B$ is given by the following equation (2):

$$V_B = \frac{E}{R_{27}\{1/(R_{10} + R_8) + 1/(R_6 + R_4)\} + 1} \quad (2)$$

Accordingly, in the engine rotational frequency domain from $N_1$ to $N_2$, the reference set points for overcurrent detection are held at constant values at all times irrespective of the engine rotational frequency.

In the engine rotational frequency domain from $N_2$ to $N_3$ where the engine rotational frequency has risen to such a level that the potential at the voltage dividing point between the resistances $R_{26}$, $R_{27}$ is higher than the output voltage E of the constant voltage circuit 5 but the potential at the voltage dividing point between the resistances $R_{27}$ and the resistance $R_{10}$ or $R_6$ is lower than the output voltage E of the constant voltage circuit 5, current flows through the route ⓑ in FIG. 4, and at this time, $V_B$ is given by the following equation (3):

$$V_B = \frac{V_C}{(R_{26} + R_{27})\{1/(R_{10} + R_8) + 1/(R_6 + R_4)\} + 1} \quad (3)$$

Accordingly, in the engine rotational frequency domain from $N_2$ to $N_3$, the reference set points for overcurrent detection change in accordance with the engine rotational frequency.

In the engine rotational domain higher than $N_3$ (e.g., the rated rotational frequency, i.e., 4,500 rpm, in the aforementioned power mode is included in this domain) where the engine rotational frequency has risen to such a level that the potential at the voltage dividing point between the resistances $R_{27}$ and the resistance $R_{10}$ or $R_6$ is higher than the output voltage E of the constant voltage circuit 5, $V_B$ is given by the following formula (4):

$$V_B = E \quad (4)$$

However, in this case the voltage drop across the diode $D_3$ is ignored. Accordingly, in the engine rotational frequency domain higher than $N_3$, the reference set points for overcurrent detection are held at constant values at all times irrespective of the engine rotational frequency.

Figure 6:
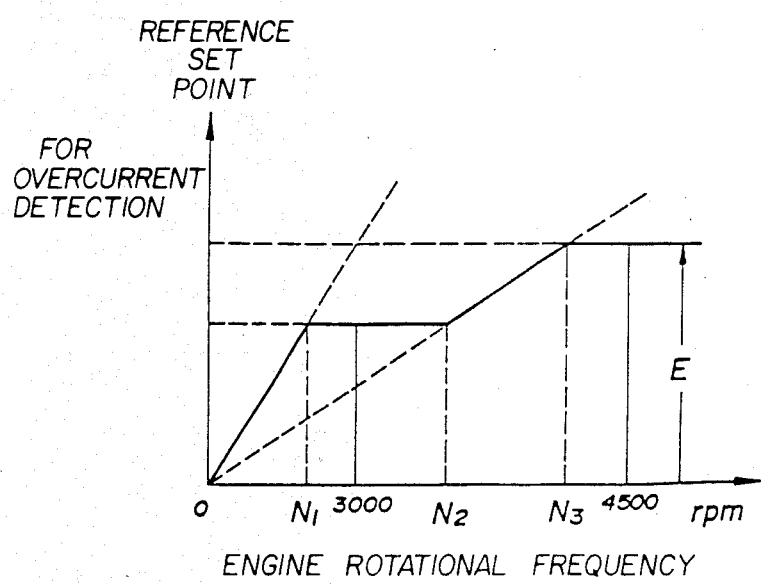
FIG. 6 is a characteristic chart showing the relationship of reference set points for detection of overcurrent with respect to the engine rotational frequency in the embodiment shown in FIG. 4.

FIG. 6 is a characteristic chart showing the relationship of the reference set points for overcurrent detection with the engine rotational frequency.

Thus, by automatically setting reference values for overcurrent detection in the inverter protecting circuit 9 by means of the automatic reference value setting circuit 20, the reference set points for overcurrent detection change in accordance with the engine rotational frequency at the time when the engine is started and the engine rotational frequency rises (i.e., the domain from 0 to $N_1$) and at the time when the engine rotational frequency rises because of a change in setting of the rated rotational frequency of the engine (i.e., the domain from $N_2$ to $N_3$), but the reference set points for overcurrent detection are fixed in the rotational frequency domain from $N_1$ to $N_2$ where the engine rotational frequency is at the rated level or in the rotational frequency domain higher than $N_3$ even when the engine rotational frequency somewhat varies from the rated one, thus enabling the protection of the inverter 3 from overcurrent to be effected stably at all times. Even when there are variations in the output characteristics of the AC generator 1, the points $N_1$, $N_2$ and $N_3$ alone change in the same direction, whereby it is possible to obtain allowable ranges within which the reference set points for overcurrent detection are allowed to remain unchanged so that they are not affected by such variations, and thus mass production efficiency is increased.

It should be noted that, although in the foregoing embodiment the rated engine rotational frequency is changed to either one or the other of the two levels, even when the number of levels to which the rated engine rotational frequency can be changed stepwisely is increased, it is possible to readily cope with the situation simply by adding the required number of resistances and diodes for the ladder network in the automatic reference value setting circuit 20.

What is claimed is:

1. In a power generating system for an engine generator provided with an engine, an AC generator driven by the engine, and an inverter for reconverting a rectification output of a main output winding of the AC generator into an alternating current of arbitrary frequency according to a driving signal, the improvement comprising an overcurrent detecting means for detecting an overcurrent state of the inverter on the basis of the result of comparison between a detected value of the current carried to said inverter and a reference value, an inverter protecting means for protecting the inverter from the overcurrent state when detected by cutting off said driving signal and thus inactivating the inverter, and an automatic reference value setting means for automatically changing said reference value stepwise to thereby set an optimal reference value in accordance with the ON/OFF state of a semiconductor switching element which is turned ON/OFF on the basis of the result of comparison between a signal based on a voltage which changes in accordance with a rectification output of an auxiliary output winding of the AC generator and a signal based on a voltage obtained by stabilizing the rectification output.

2. The power regulating system for an engine generator as defined in claim 1, wherein the main output winding forms a power supply of a main circuit system for outputting an AC power of predetermined frequency through the inverter, and the auxiliary output winding forms a power supply of a control system for generating a driving signal of the inverter.

3. The power regulating system for an engine generator as defined in claim 1 or 2, wherein the inverter comprises transistor bridge circuits switched and driven alternately on the driving signal of predetermined frequency.

4. The power regulating system for an engine generator as defined in claim 1 or 2, wherein the overcurrent detecting means and the inverter protecting means comprise in combination a mean current detecting means for detecting a mean current flowing to the inverter to detect an overcurrent state of the inverter, a peak current detecting means for detecting a presence of a peak current flowing to said inverter, and a driving signal stopping means for stopping a driving signal to said inverter continuously when the situation that an overcurrent state is kept standing for a predetermined period of time is detected by said means current detecting means or when the situation that a peak current is present for a predetermined period of time is detected by said peak current detecting means.

5. The power regulating system for an engine generator as defined in claim 4, wherein the driving signal stopping means comprises OR gates to which are inputted outputs of an oscillator generating said driving signal and a comparator.

6. The power regulating system for an engine generator as defined in claim 1 or 2, wherein the automatic reference value setting means is arranged to change the reference value stepwise by ON/OFF controlling a transistor on the basis of the result of comparison between a potential at each of the voltage dividing points between resistances which divide the rectification output of the auxiliary output winding and a voltage obtained by stabilizing the rectification output of the auxiliary output winding.

7. In a power generating system for an engine generator provided with an engine, an AC generator driven by the engine, and an inverter for reconverting a rectification output of a main output winding of the AC generator into an alternating current of arbitrary frequency according to a driving signal, the improvement comprising an overcurrent detecting means for detecting an overcurrent state of the inverter on the basis of the result of comparison between a detected value of the current carried to said inverter and a reference value, an inverter protecting means for protecting the inverter from the overcurrent state when detected by cutting off said driving signal and thus inactivating the inverter, and an automatic reference value setting means for setting said reference value by selecting in accordance with a rotational condition of the generator a signal based on a voltage which changes in accordance with a rectification output of an auxiliary output winding of the AC generator and a signal based on a voltage obtained by stabilizing the rectification output.

8. The power regulating system for an engine generator as defined in claim 7, wherein the main output winding forms a power supply of a main circuit system for outputting an AC power of predetermined frequency through the inverter, and the auxiliary output winding forms a power supply of a control system for generating a driving signal of the inverter.

9. The power regulating system for an engine generator as defined in claim 7 or 8, wherein the inverter comprises transistor bridge circuits switched and driven alternately on the driving signal of predetermined frequency.

10. The power regulating system for engine generator as defined in claim 7 or 8, wherein the overcurrent detecting means and the inverter protecting means comprise in combination a mean current detecting means for detecting a mean current flowing to the inverter to detect an overcurrent state of the inverter, a peak current detecting means for detecting a presence of a peak current flowing to said inverter, and a driving signal stopping means for stopping a driving signal to said inverter continuously when the situation that an overcurrent state is kept standing for a predetermined period of time is detected by said means current detecting means or when the situation that a peak current is present for a predetermined period of time is detected by said peak current detecting means.

11. The power regulating system for an engine generator as defined in claim 10, wherein the driving signal stopping means comprises OR gates to which are inputted outputs of an oscillator generating said driving signal and a comparator.

12. The power regulating system for an engine generator as defined in claim 7 or 8, wherein the automatic reference value setting means compares a signal based on the rectification output of the auxiliary output winding and a signal based on an output obtained by stabilizing the rectification output of the auxiliary output winding, and selects either one of the two signals to form a reference value input.

* * * * *